(12) United States Patent
Ma

(10) Patent No.: US 12,607,739 B2
(45) Date of Patent: Apr. 21, 2026

(54) MILLIMETER WAVE CAR-REVERSING RADAR

(71) Applicant: Autel Intelligent Technology Corp., Ltd., Shenzhen (CN)

(72) Inventor: Yanwen Ma, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 305 days.

(21) Appl. No.: 18/556,355

(22) PCT Filed: Mar. 18, 2022

(86) PCT No.: PCT/CN2022/081684
§ 371 (c)(1),
(2) Date: Oct. 20, 2023

(87) PCT Pub. No.: WO2022/222659
PCT Pub. Date: Oct. 27, 2022

(65) Prior Publication Data
US 2024/0210556 A1     Jun. 27, 2024

(30) Foreign Application Priority Data

Apr. 21, 2021     (CN) .......................... 202110429552.4

(51) Int. Cl.
*G01S 13/931*          (2020.01)
*G01S 7/02*            (2006.01)
(52) U.S. Cl.
CPC ............ *G01S 13/931* (2013.01); *G01S 7/027* (2021.05); *G01S 2013/9314* (2013.01)

(58) Field of Classification Search
CPC ................... G01S 13/931; G01S 7/027; G01S 2013/9314; G01S 2013/93275
(Continued)

(56) References Cited

U.S. PATENT DOCUMENTS 5,512,901 A * 4/1996 Chen ...................... H01Q 13/10
                                                       342/175
6,052,079 A * 4/2000 Kitahara ............... G01S 13/931
                                                       342/70
(Continued)

FOREIGN PATENT DOCUMENTS

CN          206400097 U       8/2017
CN          209624765 U   *  11/2019
(Continued)

OTHER PUBLICATIONS

International Search Report of PCT Patent Application No. PCT/CN2022/081684 issued on Jun. 13, 2022.

*Primary Examiner* — Nuzhat Pervin
(74) *Attorney, Agent, or Firm* — Andrew C. Cheng

(57)          ABSTRACT

An antenna board capable of transmitting and receiving millimeter wave signals is provided and the antenna board and a power board are respectively provided on both sides of a heat dissipation support, a radar interface terminal is configured to be electrically connected to the power board, and a housing is provided for accommodating and fixing components such as the power board, so that the millimeter wave car-reversing radar can not only penetrate components such as a bumper, and even if the millimeter wave car-reversing radar is mounted on a car frame, detection and car reversing and parking prompt reminding functions of the radar are likewise not affected.

7 Claims, 7 Drawing Sheets

100

(58) Field of Classification Search
USPC .......................................................... 342/175
See application file for complete search history.

(56) References Cited

U.S. PATENT DOCUMENTS

| | | | | |
|---|---|---|---|---|
| 6,073,078 | A * | 6/2000 | Kitahara ............... | G01S 13/931 |
| | | | | 342/179 |
| 7,126,525 | B2 * | 10/2006 | Suzuki ................. | H01Q 17/001 |
| | | | | 342/175 |
| 10,408,932 | B2 * | 9/2019 | Hsu ........................ | G01S 13/931 |
| 11,768,270 | B2 * | 9/2023 | Cho ...................... | G01S 7/4026 |
| | | | | 342/165 |
| 12,239,456 | B1 * | 3/2025 | Mata Magana ...... | A61B 5/0008 |
| 2008/0062038 | A1 * | 3/2008 | Ouchi .................... | G01S 7/032 |
| | | | | 342/175 |
| 2009/0209143 | A1 * | 8/2009 | Wu ...................... | H01R 13/113 |
| | | | | 439/862 |
| 2016/0240948 | A1 * | 8/2016 | Li ......................... | H01R 12/53 |
| 2018/0172825 | A1 * | 6/2018 | Hsu ......................... | G01S 7/411 |
| 2018/0348362 | A1 * | 12/2018 | Callewaert ............ | G01S 13/931 |
| 2019/0302226 | A1 * | 10/2019 | Sakai ...................... | G01S 7/032 |
| 2020/0355814 | A1 * | 11/2020 | Tsai ....................... | H01Q 19/17 |
| 2020/0404133 | A1 * | 12/2020 | Yang ...................... | H04N 23/57 |
| 2021/0391659 | A1 * | 12/2021 | Chen ...................... | H01R 9/223 |
| 2024/0039754 | A1 * | 2/2024 | Shan ................. | H04L 12/40006 |

FOREIGN PATENT DOCUMENTS

| | | | | | |
|---|---|---|---|---|---|
| CN | 209626477 | U | | 11/2019 | |
| CN | 210401647 | U | * | 4/2020 | |
| CN | 111142077 | A | | 5/2020 | |
| CN | 112014843 | A | | 12/2020 | |
| CN | 212694019 | U | | 3/2021 | |
| CN | 113075662 | A | | 7/2021 | |
| CN | 215067291 | U | | 12/2021 | |
| EP | 1118872 | B1 | * | 4/2005 | ............ H01Q 1/526 |
| EP | 1777551 | A2 | | 4/2007 | |
| EP | 3303067 | B1 | * | 10/2019 | .............. G10K 9/22 |
| JP | 2019211432 | A | | 12/2019 | |

* cited by examiner

100

MILLIMETER WAVE CAR-REVERSING RADAR

CROSS-REFERENCE TO RELATED APPLICATIONS

This application is the National Stage application for PCT patent application Serial No. PCT/CN2022/081684, filed on Mar. 18, 2022, which claims priority to Chinese patent application No. 202110429552.4, entitled "MILLIMETER WAVE CAR-REVERSING RADAR", filed on Apr. 21, 2021, by the China Patent Office, all of which are incorporated herein by reference.

TECHNICAL FIELD

The present invention is in the field of radar technology and in particular relates to a millimeter wave car-reversing radar.

BACKGROUND OF THE INVENTION

The car-reversing radar is a safety auxiliary device when the car is parked or reversed, which can inform the driver of the situation of surrounding obstacles by sound or more intuitive prompt, eliminate the trouble caused by front, back, left and right visit when the driver parks, reverses and starts the car, and help the driver to clear the blind area and overcome the defects of line of sight blur. However, the existing car-reversing radar usually cannot transmit the signal through the car bumper, so that the driver cannot be provided with a relatively stable reminding function when mounted on the car bumper. However, mounting the radar on the car bumper can solve the problem that a relatively accurate reminding function cannot be provided due to a poor signal. However, mounting the radar on the car bumper needs to have a hole in the car bumper. As a high-value consumer product, people usually have a relatively high requirement for the aesthetic degree of the appearance of the car, and the hole in the car bumper will inevitably affect the aesthetic appearance of the car as a whole.

SUMMARY OF THE INVENTION

An object of the present invention is to provide a millimeter wave reverse radar, which aims to solve the problem that the reverse radar of the prior art cannot simultaneously satisfy both of providing a reverse prompt function in which a signal is stable and at the same time ensuring that the aesthetic appearance of car as a whole is not affected.

The invention is realized in that: a millimeter wave car-reversing radar, comprising a heat dissipation support, an antenna board provided on one side of the heat dissipation support and capable of transmitting and receiving a millimeter wave signal, and a power board provided on the other side of the heat dissipation support, wherein the antenna board, the heat dissipation support and the power board are successively stacked and arranged; the millimeter wave car-reversing radar further comprises a housing having an inner cavity and a radar interface terminal, wherein the radar interface terminal and the antenna board are both electrically connected to the power board; the antenna board is provided with a main chip for controlling the millimeter wave signal and performing algorithm calculation; and the antenna board, the heat dissipation support and the power board are both accommodated in the inner cavity of the housing.

In some embodiments, the housing comprises an upper housing having an inner cavity and a base abutting with the upper housing to form a closed cavity, and the antenna board, the heat dissipation support and the power board are all accommodated in the closed cavity.

In some embodiments, a side of the heat dissipation support opposite to the antenna board is provided with a first accommodating cavity for accommodating the electronic device on the antenna board, and a side of the heat dissipation support opposite to the power board is provided with a second accommodating cavity for accommodating the electronic device on the power board.

In some embodiments, the radar interface terminal comprises an interface circuit board, an electrical contact terminal electrically connected to the interface circuit board and an interface housing, the interface circuit board is fixedly provided on the interface housing, and the electrical contact terminal is electrically connected to the power board.

In some embodiments, the interface housing is located outside the upper housing, and the interface housing is integrally formed with the upper housing, and the electrical contact terminal passes through the upper housing and is electrically connected to the power board.

In some embodiments, the electrical contact terminal is a fish-eye pin, the end of the fish-eye pin is electrically plugged on the power board, and a fish-eye terminal plug interface abutting with the fish-eye pin is provided on the power board.

In some embodiments, the electrical contact terminal and the fish-eye terminal plug interface are in an interference fit, and a middle part of the electrical contact terminal has a right-angle bending angle.

In some embodiments, an inner wall of the upper housing is provided with at least one limiting rib.

In some embodiments, a heat conducting pad for quickly conducting a heat of the main chip to the heat dissipation support is provided on the heat dissipation support at a position opposite to the main chip on the antenna board.

In some embodiments, the power board is provided with a plugging seat for electrically plugging with the antenna board, and the antenna board is provided with a plugging terminal for electrically plugging with the plugging seat; or, the power board is provided with a plugging terminal for electrically plugging with the antenna board, and the antenna board is provided with a plugging seat for electrically plugging with the plugging terminal.

The millimeter wave car-reversing radar of the present invention is provided, wherein an antenna board and a power board which can transmit and receive millimeter wave signals are respectively provided on both sides of a heat dissipation support, a radar interface terminal is configured to be electrically connected to the power board, a housing is provided for accommodating and fixing components such as the power board, and the heat dissipation support has both the functions of heat dissipation and loading support, so that the millimeter wave car-reversing radar can be made compact in structure, the requirements for an installation scenario are greatly reduced, and it can be conveniently mounted on the car frame (7) or at a narrow gap of a chassis etc., and can be well mounted and used even for a narrow installation position. In addition, the antenna board has a strong millimeter wave signal penetrating ability, and can penetrate bumper and other components well, so even if it is mounted on the car frame, detection and car reversing and parking prompt reminding functions of the radar are likewise not affected. Therefore, stable car reversing and parking etc. prompt reminding functions can be provided for a driver having a driving license without destroying the aesthetic degree of the appearance of the car. The occurrence of collision is reduced and the safety of the car is improved.

DETAILED DESCRIPTION OF THE INVENTION

In order to make the objects, technical solutions and advantages of the present invention more apparent, the present invention is further described in detail below with reference to the accompanying drawings and embodiments. It should be understood that the particular embodiments described herein are illustrative only and are not limiting.

It will be understood that when an element is referred to as being "fixed" or "provided" on another element, it can be directly on the other element or intervening elements may also be present. When an element is referred to as being 'connected' to another element, it can be directly connected to the other element or intervening elements may also be present.

It should also be noted that the terms left, right, up, down, etc. in this embodiment are merely relative concepts or references to the normal use of the product, and should not be construed as limiting.

Figure 1:
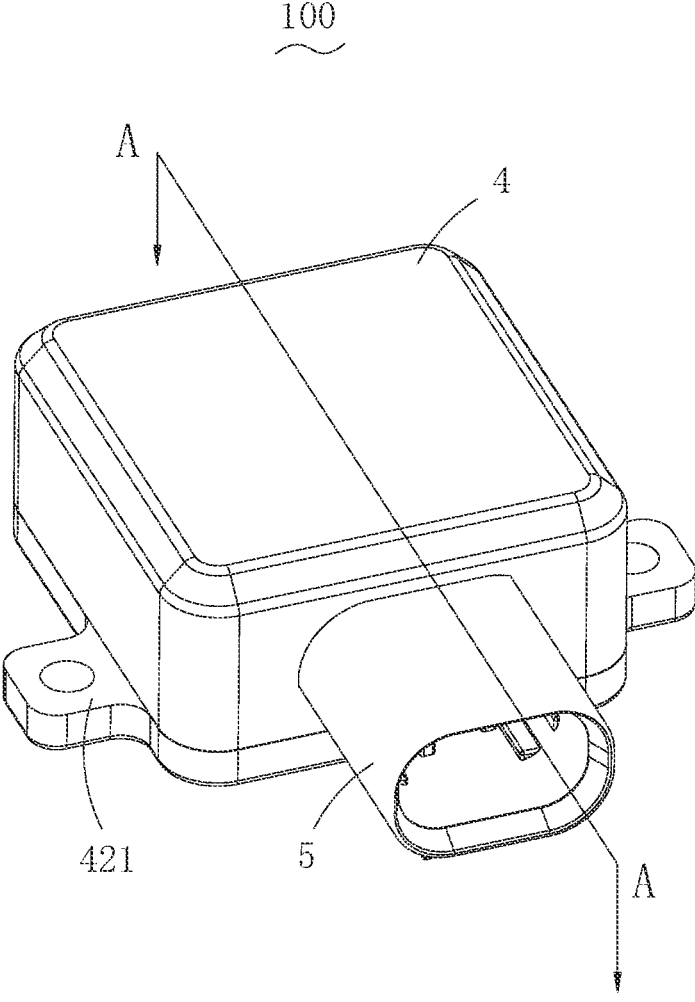
FIG. 1 is a perspective view of a millimeter wave car-reversing radar according to an embodiment of the present invention.
Figure 2:
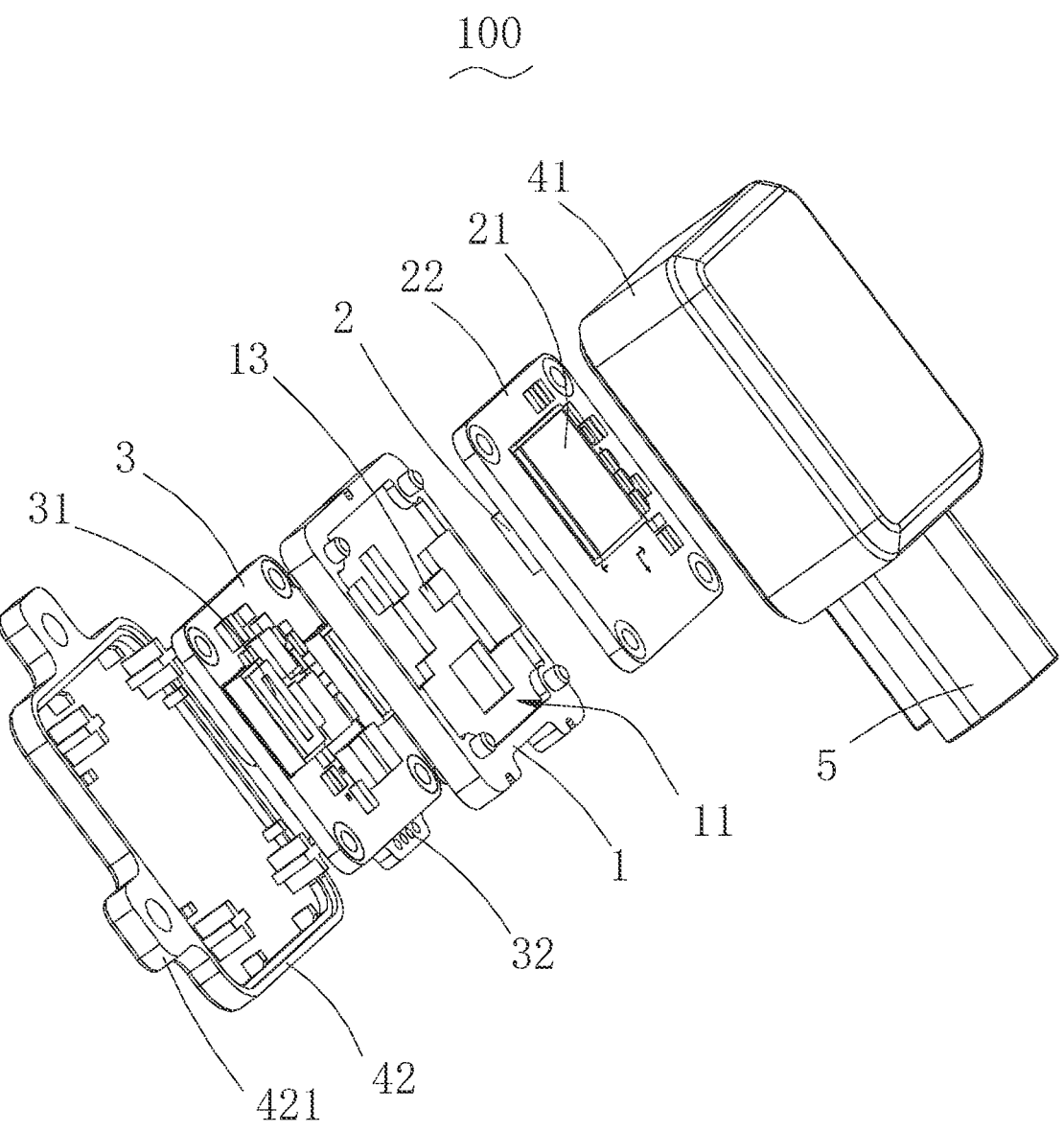
FIG. 2 is an exploded view of a millimeter wave car-reversing radar according to an embodiment of the present invention.
Figure 3:
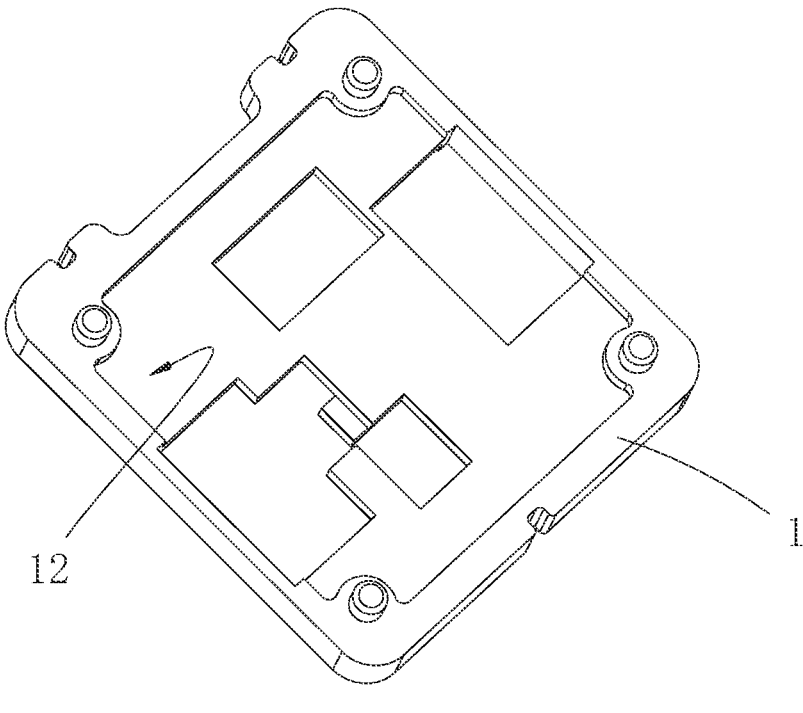
FIG. 3 is a schematic perspective view of a heat dissipation support according to an embodiment of the present invention.

As shown in FIGS. 1, 2 and 3, there is provided a related schematic diagram of a millimeter wave car-reversing radar according to an embodiment of the present invention. The millimeter wave car-reversing radar 100 provided in the embodiment of the present invention comprises a heat dissipation support 1, an antenna board 2 and a power board 3, wherein the antenna board 2, the heat dissipation support 1 and the power board 3 are successively stacked and arranged, that is to say, the antenna board 2 and the power board 3 are respectively opposite sides of the heat dissipation support 1, and the antenna board 2 and the power board 3 are both fixed on the heat dissipation support 1; and the millimeter wave car-reversing radar 100 provided in the present invention further comprises a housing 4 having an inner cavity and a radar interface terminal 5, wherein the radar interface terminal 5 and the antenna board 2 are all electrically connected to the power board 3, and the antenna board 2, the heat dissipation support 1 and the power board 3 are all accommodated in the inner cavity of the housing 4. Wherein the antenna board 2 is provided with a main chip

21, and the main chip 21 is used for controlling the transmission, reception, signal processing and algorithm operation of the millimeter wave signal of the millimeter wave car-reversing radar, namely, the antenna board 2 is used for transmitting the millimeter wave, receiving the millimeter wave reflected by the obstacle, performing radio frequency signal processing on the millimeter wave, and then performing algorithm control via the main chip 21; the power board 3 is mainly used for supplying power to circuit boards and electronic devices such as the antenna board 2 and the radar interface terminal 5, and is also used for exchanging data with the antenna board 2; the radar interface terminal 5 is used for electrically connecting with a control module of an car; on the one hand, the heat dissipation support 1 provides an installation support function for the antenna board 2 and the power board 3; on the other hand, since the antenna board 2 and the power board 3 generate heat when working, the heat dissipation support 1 can provide a heat conduction and heat dissipation function for the antenna board 2 at the same time, so as to avoid the situation that the reliability and service life thereof are reduced due to an excessive working temperature; the heat dissipation support 1 can be specifically made of metal materials such as aluminium and iron, wherein the metal materials such as aluminium and iron have a better heat dissipation performance, and can quickly dissipate heat for the antenna board 2 and the power board 3. Further, since the millimeter wave signal has a strong penetration ability, it can better penetrate bumpers, dust, smoke and the like, even if the millimeter wave car-reversing radar provided by the embodiment of the present invention is mounted on the frame of the car, it can perform a more stable prompt reminding function, and thus can perform a car reversing and parking prompt reminding function well without affecting the appearance of the car.

The millimeter wave car-reversing radar of the present invention is provided, wherein an antenna board 2 and a power board 3 which can transmit and receive millimeter wave signals are respectively provided on both sides of a heat dissipation support 1, a radar interface terminal 5 is configured to be electrically connected to the power board 3, a housing 4 is provided for accommodating and fixing components such as the power board 3, and the heat dissipation support 1 has both the functions of heat dissipation and loading support, so that the millimeter wave car-reversing radar is made compact in structure, the requirements for an installation scenario are greatly reduced, and it can be conveniently mounted on the car frame (7) or at a narrow gap of a chassis etc., and can be well mounted and used even for a narrow installation position. In addition, the main chip 21 on the antenna board 2 can transmit and receive millimeter wave signals, and the millimeter wave signals have a strong penetration ability, which can penetrate bumper and other components well, so even if it is mounted on the car frame, detection and car reversing and parking prompt reminding functions of the radar are likewise not affected. Therefore, stable car reversing and parking etc. prompt reminding functions can be provided for a driver having a driving license without destroying the aesthetic degree of the appearance of the car. The occurrence of collision can be reduced and the safety of the car are improved.

In some embodiments, the housing 4 comprises an upper housing 41 having an inner cavity and a base 42 abutting with the upper housing 41 to form a closed cavity; the heat dissipation support 1, the antenna board 2 and the power board 3 are all arranged in the closed cavity; the heat dissipation support 1 and the antenna board 2 are successively provided above the power board 3; and the antenna board 2, the heat dissipation support 1 and the power board 3 can be locked and fixedly connected together via a fastener such as a screw. At least one mounting tab 421 is provided on a side wall of the base 42 for use as a dedicated fixed mounting location when the base 42 is mounted to an external carrier such as an car. The upper housing 41 and the base 42 form a closed cavity, which can provide a dust-proof and water-proof protection function for the antenna board 2, the heat dissipation support 1, the power board 3, etc. accommodated in the closed cavity. Since the car frame is low, the car often takes up dust and mud on the road surface when traveling on the road, and the frame is close to the road surface, so it is necessary to provide a higher level of protection function, and the arrangement of the upper housing 41 and the base 42 can provide a better dust-proof and water-proof function.

As a preferred embodiment, a first accommodating cavity 11 can be provided on a wall surface of the heat dissipation support 1 which is opposite to the antenna board 2, a second accommodating cavity 12 can be provided on a wall surface of the heat dissipation support 1 which is opposite to the power board 3, and the first accommodating cavity 11 and the second accommodating cavity 12 can respectively accommodate electronic devices on the antenna board 2 and the power board 3, so that the heat dissipation support 1 does not cause the volume and thickness of the heat dissipation support 1 to be excessive while providing support and heat dissipation functions for the antenna board 2 and the power board 3, thereby ensuring the compactness of the whole millimeter wave car-reversing radar structure.

In some embodiments, a heat conducting pad 13 is provided on the heat dissipation support 1 at a position opposite to the main chip 21, so as to quickly conduct the heat of the main chip 21 to the heat dissipation support 1 for heat dissipation; since the main chip 21 consumes a relatively large amount of electricity, the local heat generated thereby is relatively large, and therefore, the heat conducting pad 13 with a relatively high heat conduction efficiency, which is used for specifically dissipating the heat of the main chip 21, is used for specifically dissipating the heat of the main chip 21, so as to solve the problem of easily burning the main chip 21 when the local temperature is too high. Specifically, the heat conducting pad 13 may be made of aluminum sheet, iron sheet, or the like, which has high heat conduction efficiency and relatively low cost.

Figure 4:
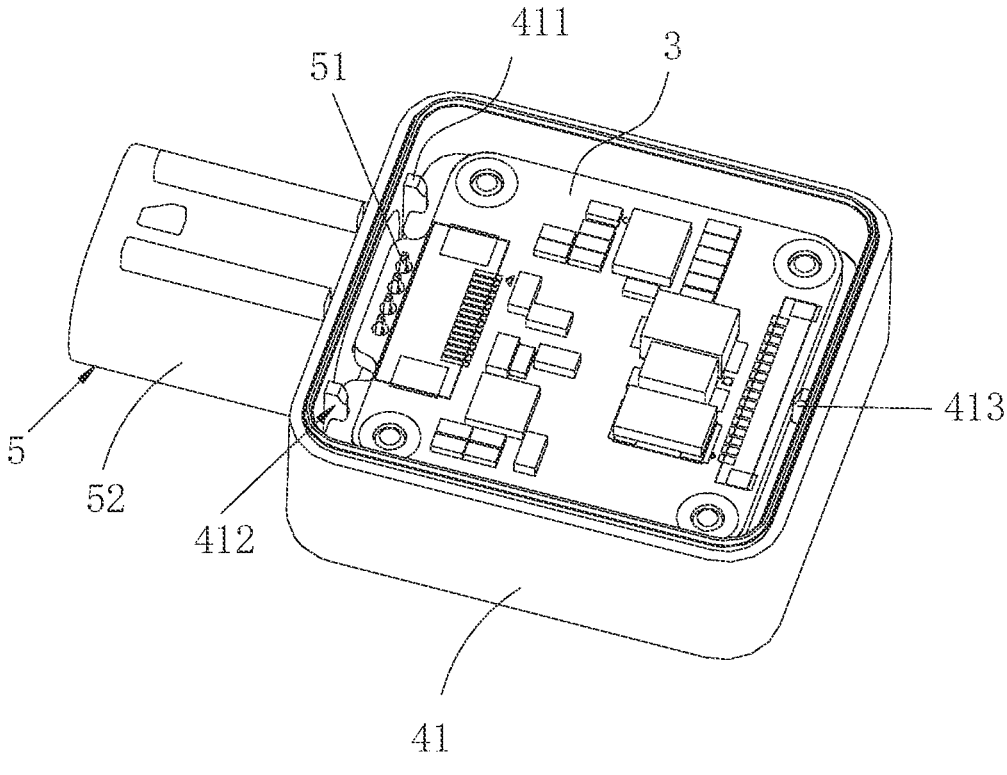
FIG. 4 is a schematic view of a millimeter wave car-reversing radar according to an embodiment of the present invention with a base removed.

As a specific embodiment, referring to FIGS. 1, 2 and 4 at the same time, the radar interface terminal 5 comprises an interface circuit board (not shown in the figure), an electrical contact terminal 51 electrically connected to the interface circuit board, and an interface housing 52, wherein the interface housing 52 is of a waist-shaped cylindrical structure, the interface circuit board is fixedly provided inside the interface housing 52, and the electrical contact terminal 51 is electrically connected to the power board 3. The radar interface terminal 5 can be used for signal communication and power supply between the car and the millimeter wave car-reversing radar.

In some embodiments, the interface housing 52 is located outside the upper housing 41, and the interface housing 52 is integrally injection molded with the upper housing 41, and the electrical contact terminal 51 passes through the upper housing 41 and is electrically connected to the power board 3. By integrally injection-moulding the interface housing 52 of the radar interface and the upper housing 41, the formation of a connection gap after being separately moulded can be avoided, and an excessive number of connection gaps will inevitably affect the dust-proof and water-proof functions thereof, therefore, integrally moulding the interface housing 52 and the upper housing 41 of the present embodiment can improve the overall dust-proof and water-proof performance of the millimeter wave car-reversing radar.

In some embodiments, the electrical contact terminal 51 of an embodiment of the present invention can be a fish-eye pin, wherein one end of the fish-eye pin is electrically connected to an interface circuit board of the radar interface terminal 5, and the other end thereof is electrically plugged into the power board 3, namely, the end thereof is electrically plugged into the power board 3; accordingly, a fish-eye terminal plug interface 32 (not shown in the figure) abutting with the fish-eye pin is provided on the power board 3, so that the radar interface terminal 5 can perform signal communication and power supply with the power board 3.

In some embodiments, the electrical contact terminal 51 is in an interference fit with the fish-eye terminal plug interface 32, and the middle part of the electrical contact terminal 51 has a bending angle; in this embodiment, the radar interface terminal 5 is provided at a side end of the upper housing 41, the power board 3 is arranged perpendicular to a side wall of the upper housing 41, and the electrical contact terminal 51 is plugged with the fish-eye terminal plug interface 32 after being bent by 90 degrees, so that the problem that the electrical contact terminal 51 and the power board 3 are arranged in parallel and are inconvenient to be plugged can be solved, and the electrical contact terminal 51 is in an interference fit with the fish-eye terminal plug interface 32 on the power board 3; the electric contact terminal 51 can be securely connected to the power board 3, and thus the problem that the electric contact terminal 51 is easily detached from the power board 3 due to frequent bumping of the car while running on the road surface, resulting in power failure and disconnection of the communication connection, can be avoided.

Figure 5:
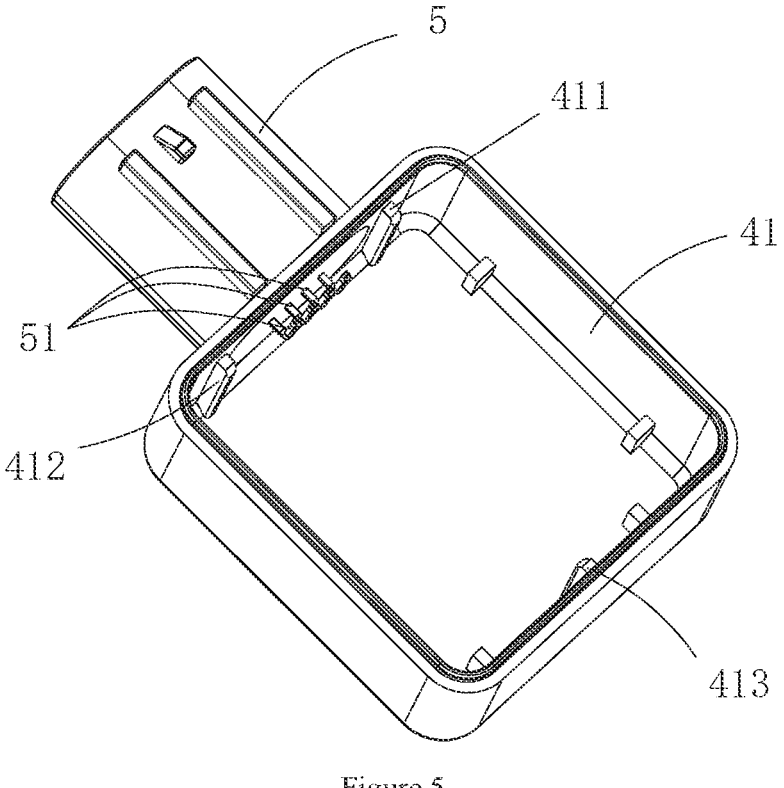
FIG. 5 is a schematic view of an upper housing provided by an embodiment of the present invention.

In some embodiments, referring to FIGS. 4 and 5, an inner wall of the upper housing 41 is provided with at least one limiting rib. In the present embodiment, the limiting ribs are provided with three, wherein a first limiting rib 411 and a second limiting rib 412 are respectively spaced at the same side in the inner cavity of the square upper housing 41, and a third limiting rib 413 is provided at the side opposite to the first limiting rib 411 and the second limiting rib 412 in the square upper housing 41, such that the first limiting rib 411, the second limiting rib 412 and the third limiting rib 413 form a triangular limiting structure, thereby stably limiting and positioning the heat dissipation support 1 and the upper housing 41. The limiting rib may also provide a mounting guide function during its installation so that a heat dissipation support or the like may be quickly mounted in the upper housing 41 during assembly. In some embodiments, the upper housing 41 and the base 42 may be joined by ultrasonic welding. The ultrasonic welding line can be designed on the abutting surface of the upper housing 41 and the base 42, so that after the ultrasonic welding is used between the upper housing 41 and the base 42, the fixed connection between the upper housing 41 and the base 42 can be ensured, and the requirements of high dust-proof and water-proof grade can be met.

In some embodiments, with reference to FIG. 2, the power board 3 is provided with a plugging seat 31 for electrically plugging with the antenna board 2, the antenna board 2 is provided with a plugging terminal 22 for electrically plugging with the plugging seat 31, and functions such as communication and data transmission between the power board 3 and the antenna board 2 are realized through the electrical connection between the plugging seat 31 and the plugging terminal 22; alternatively, the plugging seat 31 and the plugging terminal 22 can be adjusted to each other, namely, a plugging terminal (not shown in the figure) for electrically plugging with the antenna board 2 is provided on the power board 3, and a plugging seat (not shown in the figure) for electrically plugging with the plugging terminal is provided on the antenna board 2, which can also realize functions such as communication transmission.

Figure 6:
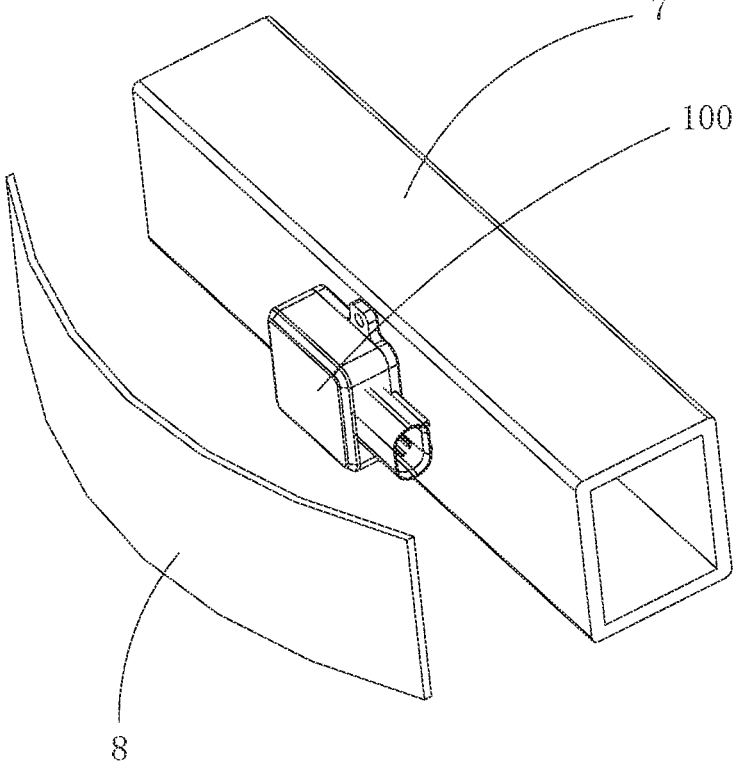
FIG. 6 is a schematic view of a millimeter wave car-reversing radar mounted on a car frame according to an embodiment of the present invention.

Referring to FIG. 6, which is an installation schematic view showing that the millimeter wave car-reversing radar 100 according to the embodiment of the present invention is mounted on a car frame 7, and the millimeter wave car-reversing radar 100 is arranged opposite to a bumper 8. With the millimeter wave car-reversing radar 100 according to the embodiment of the present invention, the millimeter wave car-reversing radar 100 only needs a small installation gap, and the millimeter wave signal emitted therefrom can penetrate the bumper 8, and even in the weather such as dust and smoke, the millimeter wave car-reversing radar 100 can emit and receive a relatively stable signal, thereby providing the driver with a car reversing and parking prompt reminding experience with better stability and higher safety.

Figure 7:
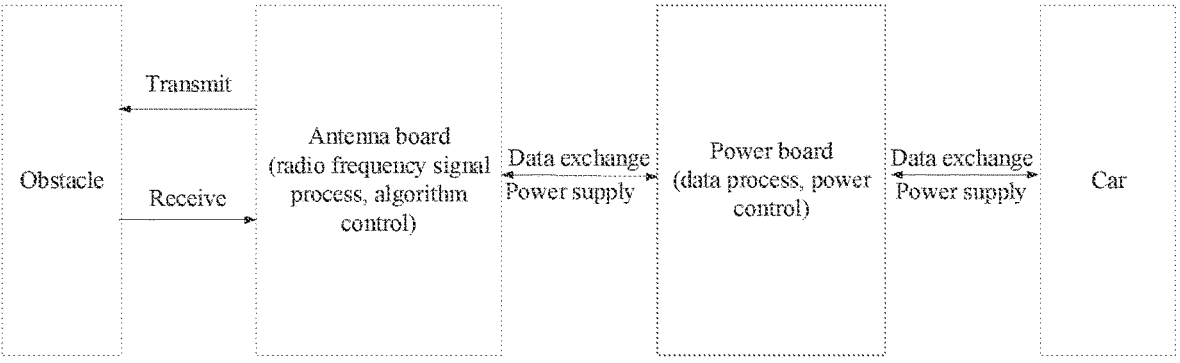
FIG. 7 is a control principle block diagram of a millimeter wave car-reversing radar mounted on a car according to an embodiment of the present invention.

Referring to FIG. 7, a control principle block diagram of a millimeter wave car-reversing radar mounted on a car according to an embodiment of the present invention is shown. An antenna board is used for transmitting millimeter wave signals, receiving the millimeter wave signals reflected by an obstacle, performing radio frequency signal processing on the millimeter wave and then performing algorithm control via a main chip; a power board is used for supplying power to the antenna board and exchanging data with the antenna board. The main chip on the antenna board transmits and receives millimeter wave signals, and determines the relative distance, relative angle and relative speed of the car from the obstacle by processing the signals. The millimeter wave car-reversing radar according to an embodiment of the present invention can prevent a car from colliding with an obstacle in the event of reversing, improve the safety of the car, and reduce the incidence of collision.

The above are only preferred embodiments of the present invention, and are not intended to limit the present invention. Any modification, equivalent replacement or improvement made within the spirit and principle of the present invention should be included in the protection scope of the present invention.

The invention claimed is:

1. A millimeter wave car-reversing radar, comprising a heat dissipation support, an antenna board provided on one side of the heat dissipation support and capable of transmitting and receiving a millimeter wave signal, and a power board provided on the other side of the heat dissipation support, wherein the antenna board, the heat dissipation support and the power board are successively stacked and arranged; the millimeter wave car-reversing radar further comprises a housing having an inner cavity and a radar interface terminal, wherein the radar interface terminal and the antenna board are both electrically connected to the power board; the antenna board is provided with a main chip for controlling the millimeter wave signal and performing algorithm calculation; and the antenna board, the heat dissipation support and the power board are both accommodated in the inner cavity of the housing;

wherein the housing comprises an upper housing having an inner cavity and a base abutting with the upper housing to form a closed cavity, and the antenna board, the heat dissipation support and the power board are all accommodated in the closed cavity;

wherein the radar interface terminal comprises an interface circuit board, an electrical contact terminal electrically connected to the interface circuit board and an interface housing, the interface circuit board is fixedly provided on the interface housing, and the electrical contact terminal is electrically connected to the power board;

wherein the interface housing is located outside the upper housing, and the interface housing is integrally formed with the upper housing, and the electrical contact terminal passes through the upper housing and is electrically connected to the power board.

2. The millimeter wave car-reversing radar according to claim 1, wherein a side of the heat dissipation support opposite to the antenna board is provided with a first accommodating cavity for accommodating the electronic device on the antenna board, and a side of the heat dissipation support opposite to the power board is provided with a second accommodating cavity for accommodating the electronic device on the power board.

3. The millimeter wave car-reversing radar according to claim 1, wherein the electrical contact terminal is a fish-eye pin, the end of the fish-eye pin is electrically plugged on the power board, and a fish-eye terminal plug interface abutting with the fish-eye pin is provided on the power board.

4. The millimeter wave car-reversing radar according to claim 3, wherein the electrical contact terminal and the fish-eye terminal plug interface are in an interference fit, and a middle part of the electrical contact terminal has a right-angle bending angle.

5. The millimeter wave car-reversing radar according to claim 1, wherein an inner wall of the upper housing is provided with at least one limiting rib.

6. The millimeter wave car-reversing radar according to claim 1, wherein a heat conducting pad for quickly conducting a heat of the main chip to the heat dissipation support is provided on the heat dissipation support at a position opposite to the main chip on the antenna board.

7. The millimeter wave car-reversing radar according to claim 1, wherein the power board is provided with a plugging seat for electrically plugging with the antenna board, and the antenna board is provided with a plugging terminal for electrically plugging with the plugging seat; or, the power board is provided with a plugging terminal for electrically plugging with the antenna board, and the antenna board is provided with a plugging seat for electrically plugging with the plugging terminal.

* * * * *